United States Patent
White et al.

(10) Patent No.: US 10,021,117 B2
(45) Date of Patent: Jul. 10, 2018

(54) SYSTEMS AND APPARATUS FOR ANALYZING SECURE NETWORK ELECTRONIC COMMUNICATION AND ENDPOINTS

(71) Applicant: BANK OF AMERICA CORPORATION, Charlotte, NC (US)

(72) Inventors: Alan White, Harrisburg, NC (US); Michael B. Stark, Sherborn, MA (US); Scott Morton, Rehoboth Beach, DE (US); Jyothishwar Reddy Sama, Edison, NJ (US); Amer Ali, Jersey City, NJ (US); Lois Ann Helmerson, Wilmington, DE (US); Mark Atchley, Lindale, TX (US); Jeffrey Myers, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 29 days.

(21) Appl. No.: 14/986,876

(22) Filed: Jan. 4, 2016

(65) Prior Publication Data
US 2017/0195343 A1    Jul. 6, 2017

(51) Int. Cl.
H04L 29/06    (2006.01)
H04L 29/12    (2006.01)

(52) U.S. Cl.
CPC ...... H04L 63/1408 (2013.01); H04L 61/2007 (2013.01); H04L 63/0227 (2013.01); H04L 63/0236 (2013.01)

(58) Field of Classification Search
CPC ............. H04L 63/0227; H04L 63/0236; H04L 63/1408
See application file for complete search history.

(56) References Cited

U.S. PATENT DOCUMENTS

| | | | |
|---|---|---|---|
| 6,463,474 B1 * | 10/2002 | Fuh | H04L 63/0227 709/225 |
| 7,451,234 B1 * | 11/2008 | Bonner | H04L 29/12066 709/220 |
| 8,789,135 B1 * | 7/2014 | Pani | 370/229 |
| 9,112,911 B1 * | 8/2015 | Karhade | H04L 63/0227 |
| 9,380,027 B1 * | 6/2016 | Lian | H04L 63/0263 |
| 9,584,372 B2 * | 2/2017 | Bragstad | H04L 41/14 |
| 2001/0039623 A1 * | 11/2001 | Ishikawa | H04L 12/12 726/23 |

(Continued)

OTHER PUBLICATIONS

X. Hu and Z. M. Mao, "Accurate Real-time Identification of IP Prefix Hijacking," 2007 IEEE Symposium on Security and Privacy (SP '07), Berkeley, CA, 2007, pp. 3-17.*

(Continued)

*Primary Examiner* — Kari L Schmidt
(74) *Attorney, Agent, or Firm* — Michael A. Springs; Moore & Van Allen PLLC; James C. Edwards (57) ABSTRACT

The present invention provides for analyzing secured network traffic to determine which devices and/or applications are accessed by authorized, and in some instances, unauthorized third-party entities. A fully automated methodology is disclosed for verification and validation of secured network accesses performed by an authorized third-party entity and the monitoring and investigation of unauthorized third-party threats/attacks on the secured network.

16 Claims, 3 Drawing Sheets

(56) References Cited

U.S. PATENT DOCUMENTS

| | | | | |
|---|---|---|---|---|
| 2003/0055993 A1* | 3/2003 | Lee | H04L 63/0236 | 709/229 |
| 2003/0123465 A1* | 7/2003 | Donahue | H04L 45/02 | 370/401 |
| 2003/0149766 A1* | 8/2003 | Syvanne | H04L 63/0263 | 709/224 |
| 2004/0172557 A1* | 9/2004 | Nakae | H04L 63/0227 | 726/22 |
| 2004/0223495 A1* | 11/2004 | Pachl | H04L 41/0893 | 370/395.31 |
| 2005/0204159 A1* | 9/2005 | Davis | H04L 51/12 | 726/5 |
| 2005/0216956 A1* | 9/2005 | Orr | H04L 63/0209 | 726/23 |
| 2005/0238034 A1* | 10/2005 | Gillespie | H04L 29/12509 | 370/401 |
| 2006/0137002 A1* | 6/2006 | Forrester | H04L 45/00 | 726/11 |
| 2007/0097976 A1* | 5/2007 | Wood | H04L 63/1416 | 370/392 |
| 2007/0136813 A1* | 6/2007 | Wong | G06F 21/552 | 726/25 |
| 2009/0185568 A1* | 7/2009 | Cho | H04L 47/10 | 370/395.31 |
| 2009/0209349 A1* | 8/2009 | Padhye | H04L 67/101 | 463/42 |
| 2014/0165207 A1* | 6/2014 | Engel | H04L 63/1425 | 726/25 |
| 2015/0047034 A1* | 2/2015 | Burnham | H04L 63/1441 | 726/23 |
| 2015/0128246 A1* | 5/2015 | Feghali | H04L 63/0209 | 726/13 |
| 2015/0281176 A1* | 10/2015 | Banfield | H04L 63/0218 | 726/11 |

OTHER PUBLICATIONS

Yan, Ye, et al. "A survey on cyber security for smart grid communications." IEEE Communications Surveys and tutorials 14.4 (2012) : 998-1010.*

* cited by examiner

SYSTEMS AND APPARATUS FOR ANALYZING SECURE NETWORK ELECTRONIC COMMUNICATION AND ENDPOINTS

FIELD

In general, embodiments of the invention relate to secure communication networks and, more particularly, systems and the like for analyzing secure network electronic communication to determine devices and applications accessed by external entities.

BACKGROUND

In a large enterprise environment it is not uncommon for an enterprise (referred to herein as a first entity) to grant vendors, third-party entities or the like (referred to herein as second entities) access to secure information (i.e., access to information that is behind the enterprise's firewall. An example of such accessing of secured information by vendors/third-party entities is business-to-business (B2B) communication, which involves the transaction of goods or services between business entities through. In such instances the vendor/third-party entity has the ability, through a dedicated connection, to constantly access the secured information and, as such, has the ability to access a multitude of different devices and applications that exist behind the enterprise's firewall.

However, in instances in which an enterprise grants access to secured information to vendors/third-parties it is often difficult, if not impossible, to determine information associated with the accesses; such as, who accessed the secured information, the time at which the secured information was accessed and the specific devices and/or applications that were accessed by the vendor/third-parties. Manual attempts at trying to catalog information associated with accesses is not only inefficient but is also prone to be highly inaccurate. In the event that the information associated with the accesses is required for audit purposes, manual processing is too time consuming and the results of the audit are suspect.

In addition to authorized access of secured information, enterprises are highly susceptible to unauthorized entities, such as hackers or the like, attempting to access secured information. In the event that the attack is successful, the enterprise has an immediate need to know the extent of the attack, i.e., who accessed the secure information, the time of the access, the devices/applications affected by the attack and the like. Once again, manual investigations do not provide the required immediacy nor accuracy required in the event of an unauthorized attack on secured information. Moreover, such manual investigations tend to focus on information stored in memory (i.e., tables and the like), which is indicative of previous attacks/threats but does not account for ongoing attacks/threats in which the unauthorized entities are currently accessing secured information.

Therefore, a need exists to develop systems, apparatus, computer program products, methods and the like that a fully automated means for capturing information related to secured communication and the accessing of secured information. The desired systems, apparatus and the like should be able to determine what entity is accessing the secured information and the devices and applications that are being accessed. Moreover, the desired systems, apparatus and the like should not only automatically catalog historical secure information accesses but, in addition, have the capability to capture, in real-time, ongoing secured information accesses. As such, the desired systems, apparatus and the like should provide an efficient and accurate means for auditing the accesses conducting by authorized entities, i.e., vendors and the like, as well as an automated means for real-time investigation of attacks/threats that may be currently ongoing within the secured network environment.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for analyzing secured network traffic to determine which devices and/or applications are accessed by authorized, and in some instances, unauthorized third-party entities. In this regard embodiments of the present invention fully automate the verification and validation of secured network accesses performed by an authorized third-party entity and monitoring and investigation of unauthorized third-party threats/attacks on the secured network. From the verification and validation perspective, the present invention is able to determine who accessed or is accessing the secure network (i.e., which third-party entity) and the devices and/or applications accessed by the third-party entity. From the monitoring and investigative standpoint, the present invention is capable of not only cataloging secure network accesses that occurred in the past (i.e., historical accesses) but, based on the fact that "live" data is being used in the determination process, the invention is also capable of determining which devices and applications a particular entity, such as an intruder or the like, is currently accessing. As such, the systems, apparatus and the like provide an efficient and accurate means for auditing the accesses conducting by authorized third-party entities, i.e., vendors and the like, as well as an automated means for real-time investigation of attacks/threats that may be currently ongoing within the secured network environment.

An apparatus for analyzing secure network electronic communication for determining endpoints defines first embodiments of the invention. The apparatus includes a computing platform having a memory and at least one processor in communication with the memory. Further, the apparatus includes a secure network communication analysis module that is stored in the memory and executable by the processor. The module is configured to receive Internet Protocol (IP) addresses from a plurality of routers and a plurality of firewalls that are disposed within a secure computing network of a first entity. The module is further configured to determine that one or more of the IP addresses are associated with second entities other than the first entity and determine an identity for one or more of the second entities. In addition the module is configured to, based on the one or more IP addresses associated with the second entities, determine, at least one of, one or more devices disposed within the secure computing network or one or more applications executable within the secure computing network that the second entities have accessed or are currently accessing and, subsequently, correlate the identity of the one or more second entities with at least one of the devices determined to have been accessed by a corresponding second entity or the applications determined to have been accessed by a corresponding second entity.

In specific embodiments of the apparatus, the module is further configured to receive the IP addresses by accessing router tables and firewall tables stored in memory of the plurality of routers and firewalls to identify both static IP addresses and dynamic IP addresses stored in the tables.

In other specific embodiments of the apparatus, the module is further configured to determine that the one or more of the IP addresses are associated with the second entities by (i) comparing the IP addresses received from the routers to the IP addresses received from the firewalls to identify one or more matches between an IP address received from the routers and an IP address received from the firewalls, (ii) accessing a first entity IP address database to determine which of the one or more matched IP addresses are associated with the first entity, and (iii) filtering out the one or more matched IP addresses that are determined to be associated with the first entity, wherein the one or more matched IP addresses remaining after the filtering are defined as IP addresses associated with the second entities.

In still further specific embodiments of the apparatus, the module is further configured to determine the identity of each second entity by accessing an Internet-based IP registrar that associates IP addresses with identities of entities. In such embodiments of the apparatus, the module may implement an enterprise service bus to make RESTful (Representational State Transfer) Application Programming Interface (API) calls to a web service hosting the Internet-based IP registrar to apply, sequentially, the one or more IP addresses associated with the second entities to the IP registrar to identify identities of the second entities.

In other specific embodiments of the apparatus, the module is further configured to determine the devices or the applications that the second entities have accessed by (i) determining one or more source IP addresses and one or more destination IP addresses that the IP addresses associated with the second entities has access to within the first entity, (ii) accessing a first entity IP address database to determine which of the source IP addresses and destination IP addresses are associated with the first entity, and (iii) filtering out the source IP addresses and the destination IP addresses that are determined to not be associated with the first entity, wherein the source IP addresses and destination IP addresses remaining after the filtering are defined as source IP addresses associated with the first entity and destination IP associated with the first entity. In such embodiments of the apparatus, the module may implement an enterprise service bus to make RESTful (Representational State Transfer) Application Programming Interface (API) calls to a firewall rules database to apply, sequentially, the IP addresses associated with the second entities to firewall rules to determine the one or more source IP addresses and the one or more destination IP addresses that the IP address associated with the second entity has access to.

In yet other specific embodiments of the apparatus, the module is further configured to determine the devices that the second entities have accessed or are accessing by executing queries to one or more Systems Of Records (SORs) within the first entity to determine one or more devices that were accessed using one of the source IP addresses associated with the first entity or destination IP addresses associated with the first entity. In such embodiments of the apparatus, the module may execute the queries by implementing an enterprise service bus to make RESTful (Representational State Transfer) Application Programming Interface (API) calls to the SORs to determine one or more devices that were accessed using one of the source IP addresses associated with the first entity or destination IP addresses associated with the first entity.

Moreover, in other specific embodiments of the apparatus, the module is further configured to generate and initiate communication of one or more reports that indicate the identity of the one or more second entities correlated to at least one of the devices determined to have been accessed by the corresponding second entity or the applications determined to have been accessed by the corresponding second entity.

A system for analyzing secure network electronic communication for determining endpoints defines second embodiments of the invention the system includes a plurality of routers and a plurality of firewalls, each of which are disposed within a secure computing network of a first entity. In addition, the system includes an Internet Protocol (IP) address database that stores IP addresses associated with the first entity, a firewall rules database that stores first entity rules related to source IP addresses and destination IP addresses accessibility by specified IP addresses and a plurality of Systems of Record (SOR) associated with the first entity that include log-in records that indicate IP addresses used to log-in to a specified computing device.

Additionally, the system includes a computing platform having a memory and at least one processor in communication with the memory, and a secure network communication analysis module that is stored in the memory and executable by the processor. The module is configured to receive Internet Protocol (IP) addresses from the plurality of routers and the plurality of firewalls and determine that one or more of the IP addresses are associated with second entities other than the first entity. The module performs such a determination by determining matches between the IP addresses received from the routers and the IP addresses received from the firewalls and accessing the IP address database to determine which of the one or more matched IP addresses are included in the database, such that, matched IP addresses determined not to be included in the database are IP addresses associated with the second entities. The module is further configured to determine an identity for one or more of the second entities.

Further, the module is configured to, based on the one or more IP addresses associated with the second entities, determine, at least one of, one or more devices disposed within the secure computing network or one or more applications executable within the secure computing network that the second entities have accessed or are currently accessing. Such a determination is performed by accessing the firewall rules database to determine one or more source IP addresses and one or more destination IP addresses that the IP addresses associated with the second entities has access to within the first entity, accessing the IP address database to determine which of the source IP addresses and destination IP addresses are associated with the first entity, and determining at least one of the devices or applications that the second entities have accessed or are accessing by executing queries to one or more of the SORs to determine one or more devices that were accessed using one of the source IP addresses associated with the first entity or destination IP addresses associated with the first entity. Moreover, the module is configured to correlate the identity of the one or more second entities with at least one of the devices determined to have been accessed by a corresponding second entity or the applications determined to have been accessed by a corresponding second entity.

In specific embodiments of the system, the module is further configured to receive the IP addresses by accessing router tables and firewall tables stored in memory of the plurality of routers and firewalls to identify static IP addresses and dynamic IP addresses stored in the tables.

In other specific embodiments of the invention, the module is configured to determine the identity for one or more of the second entities by accessing an Internet-based IP registrar that associates IP addresses with identities of entities. In such embodiments of the invention an enterprise service bus may be implemented to make RESTful (Representational State Transfer) Application Programming Interface (API) calls to a web service hosting the Internet-based IP registrar to apply, sequentially, the one or more IP addresses associated with the second entities to the IP registrar to identify identities of the second entities.

In other embodiments of the system, the module is further configured to determine the one or more source IP addresses and the one or more destination IP addresses by implementing an enterprise service bus to make RESTful (Representational State Transfer) Application Programming Interface (API) calls to the firewall rules database to apply, sequentially, the IP addresses associated with the second entities to firewall rules to determine the one or more source IP addresses and the one or more destination IP addresses that the IP address associated with the second entity has access to.

In further specific embodiments of the system, the module is further configured to execute the queries to the SORs by implementing an enterprise service bus to make RESTful (Representational State Transfer) Application Programming Interface (API) calls to the SORs to determine one or more devices that were accessed using one of the source IP addresses associated with the first entity or destination IP addresses associated with the first entity.

In still further specific embodiments of the system, the module is configured to generate and initiate communication of one or more reports that indicate the identity of the one or more second entities correlated to at least one of the devices determined to have been accessed by the corresponding second entity or the applications determined to have been accessed by the corresponding second entity.

A computer program product including a non-transitory computer-readable medium defines third embodiments of the invention. The computer-readable medium includes a first set of codes for causing a computer to receive Internet Protocol (IP) addresses from a plurality of routers and a plurality of firewalls that are each disposed within a secure computing network of a first entity. The computer-readable medium includes a second set of codes for causing a computer to determine that one or more of the IP addresses are associated with second entities other than the first entity and a third set of codes for causing a computer to determine an identity for one or more of the second entities. In addition, the computer-readable medium includes a fourth set of codes for causing a computer to, based on the one or more IP addresses associated with the second entities, determine, at least one of, one or more devices disposed within the secure computing network or one or more applications executable within the secure computing network that the second entities have accessed or are currently accessing. In addition, the computer-readable medium includes a fifth set of codes for causing a computer to correlate the identity of the one or more second entities with at least one of the devices determined to have been accessed by a corresponding second entity or the applications determined to have been accessed by a corresponding second entity.

Thus, systems, apparatus, methods, and computer program products herein described in detail below provide for analyzing secured network traffic to determine which devices and/or applications are accessed by authorized, and in some instances, unauthorized third-party entities. In this regard embodiments of the present invention, described in detail below, fully automate the verification and validation of secured network accesses performed by an authorized third-party entity and the monitoring and investigation of unauthorized third-party threats/attacks on the secured network.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for analyzing secured network traffic, such as B2B (business-to-business) communication or the like, to determine which devices and/or applications are accessed by authorized or unauthorized third-party entities (referred to herein as second entities). In this regard embodiments of the present invention fully automate the verification and validation of secured network accesses performed by an authorized third-party entity and monitoring and investigation of unauthorized third-party threats/attacks on the secured network. From the verification and validation perspective, the present invention is able to determine who accessed or is accessing the secure network (i.e., which third-party entity) and the devices and/or applications accessed by the third-party entity. From the monitoring and investigative standpoint, the present invention is capable of not only cataloging secure network accesses that occurred in the past (i.e., historical accesses) but, based on the fact that "live" data is being used in the determination process, the invention is also capable of determining which devices and applications a particular entity, such as an intruder or the like, is currently accessing. As such, the systems, apparatus and the like provide an efficient and accurate means for auditing the accesses conducting by authorized third-party entities, i.e., vendors and the like, as well as an automated means for real-time investigation of attacks/threats that may be currently ongoing within the secured network environment.

Figure 1:
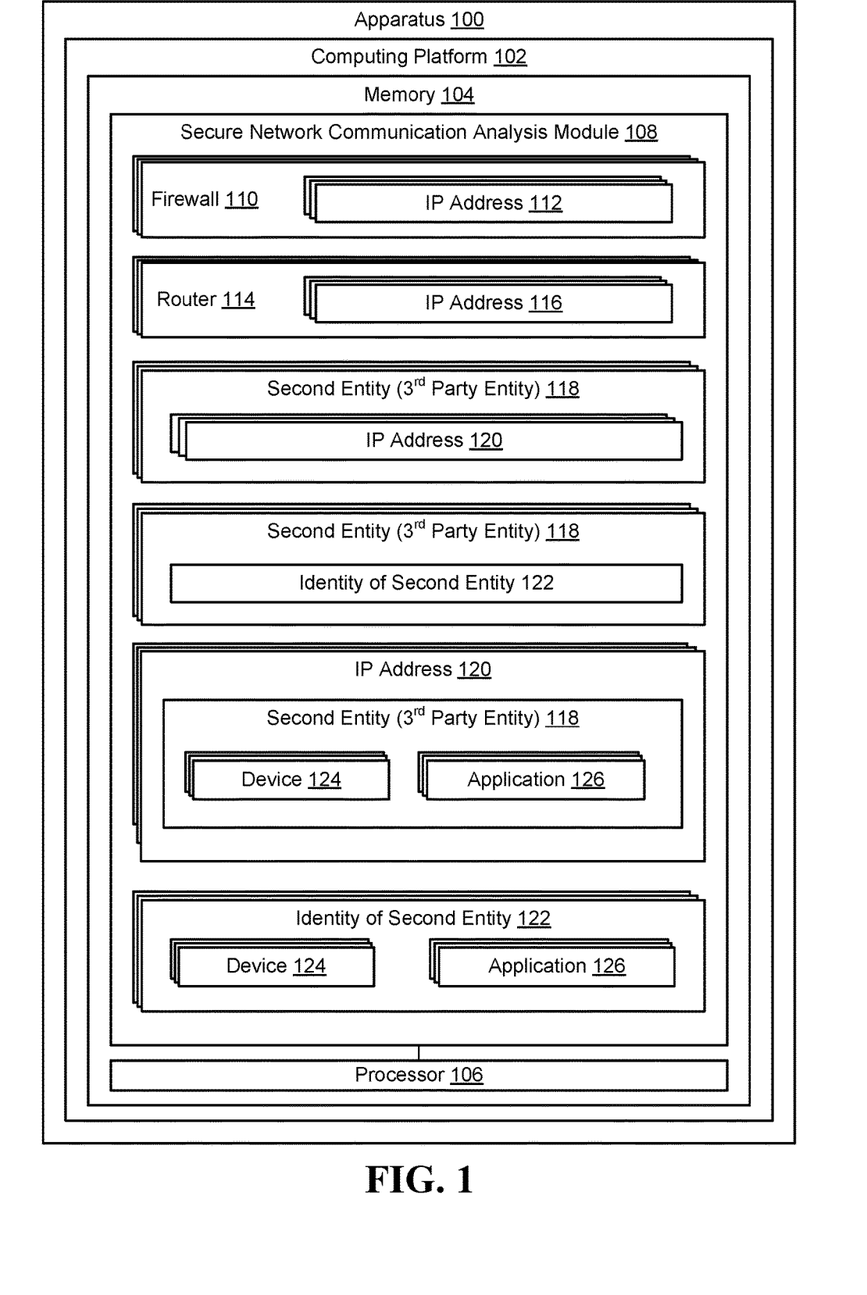
FIG. 1 provides a block diagram of an apparatus for analyzing secure network communications to determine endpoints, in accordance with embodiment of the present invention.

Referring to FIG. 1, a block diagram is provided of apparatus 100 configured for analyzing secured network traffic, such as B2B (business-to-business) communication or the like, to determine what third-party entities accessed the network and the endpoints (i.e., which devices and/or applications) accessed or are being accessed by that third-party entity, in accordance with embodiments of the present invention. Apparatus 100 includes a computing platform 102 having a memory 104 and at least one processor 106 in communication with the memory 104. Apparatus 100 may comprise multiple devices, such as multiple servers, storage devices, personal computers and the like.

Memory 104 may comprise volatile and non-volatile memory, such as read-only and/or random-access memory (RAM), read-only memory ROM, EPROM, EEPROM, flash cards, or any memory common to computer platforms. Further, memory 104 may include one or more flash memory cells, or may be any secondary or tertiary storage device, such as magnetic media, optical media, tape, or soft or hard disk. Moreover, memory 104 may comprise cloud storage, such as provided by a cloud storage service and/or a cloud connection service.

Further, processor 106 may be an application-specific integrated circuit ("ASIC"), or other chipset, processor, logic circuit, or other data processing device. Processor 106 or other processor such as ASIC may execute an application programming interface ("API") (not shown in FIG. 1) that interfaces with any resident programs or modules, such as secure network communication analysis module 108 and routines, sub-modules associated therewith or the like stored in memory 104 of apparatus 108. In specific embodiments of the invention, the API is a Representational State Transfer (RESTful) API that uses Hyper Text Transfer Protocol (HTTP) to access and obtain information. Processor 106 includes various processing subsystems (not shown in FIG. 1) embodied in hardware, firmware, software, and combinations thereof, that enable the functionality of apparatus 100 and the operability of the apparatus 100 on a network. For example, processing subsystems allow for initiating and maintaining communications and exchanging data with other networked computing platforms. For the disclosed aspects, processing subsystems of processor 106 may include any subsystem used in conjunction with secure network communication analysis module 108 and related algorithms, sub-algorithms, modules, sub-modules thereof.

Computer platform 102 may additionally include a communications module (not shown in FIG. 1) embodied in hardware, firmware, software, and combinations thereof, that enables communications among the various components of the computing platform 102, as well as between the other networked devices. Thus, communication analysis module may include the requisite hardware, firmware, software and/or combinations thereof for establishing and maintaining a network communication connection.

Memory 104 stores secure network communication analysis module 108 that is executable by processor 106 and configured to analyzing secured network traffic to determine what third-party entity, referred to herein as the second entity, accessed the network and the endpoints (i.e., which devices and/or applications) accessed or are being accessed by the second entity.

In this regard, secure network communication analysis module 108 is configured to receive Internet Protocol (IP) addresses 112 from a plurality of firewalls 110 and IP addresses 116 from a plurality of routers 114, both of which are disposed within a secure computing network of a first entity (i.e., the entity that is attempting to determine which second entities accessed their secure network and devices and/or applications accessed by those second entities). In specific embodiments of the invention, the IP addresses 112 and 116, which include both static IP addresses and dynamic IP addresses are stored in router tables and firewall tables associated with corresponding routers and firewalls.

Secure network communication analysis module 108 is further configured to determine that one or more of the IP addresses 120 are associated with (i.e., belong to or the like) second entities 118 other than the first entity (i.e., third party entities, such as vendors, B2B partners or the like). In specific embodiments of the invention the second entity IP addresses 120 are determined by comparing the IP addresses 112 and 116 to determine matches and determining which of the matched IP addresses belong to the first entity; the remaining matched IP addresses (i.e., those that do not belong to the first entity) are deemed to be second entity IP addresses 120.

In response to determining which of the IP addresses 120 are associated with the second entity 118, secure network communication analysis module 108 is further configured to determine an identity 112 for each of the second entities 122. In specific embodiments of the invention, the identities 112 of the second entities 122 are determined by accessing a web-based service that includes an IP registrar that identifies the owner of IP addresses.

Further, secure network communication analysis module 108 is configured to determine, based on the IP addresses 120, at least one of, (1) devices 124 disposed within the secure computing network that the second entities 118 has accessed or is currently accessing and/or (2) applications 126 executable within the secure computing network that the second entities 118 have accessed or are currently accessing. In specific embodiments of the invention, the determination as which devices 124 and/or applications 126 the second entities 118 have accessed or are accessing is accomplished by applying the IP addresses 120 to a first entity firewall rules database or the like to determine which source IP addresses and destination addresses the IP address 120 has access to and, subsequently determining which of the identified source IP addresses and destination IP are associated with the first entity. The source IP addresses and destination IP addresses that are determined to be associated with the first entity are then queried against first entity system of records (SORs) and the like to determine which devices 124 or applications 126 were logged into or otherwise accessed (or are currently being accessed) using the source or destination IP address. Such devices 124 and applications 126 are deemed to be devices and applications accessed by the second entities 126.

Moreover, secure network communication analysis module 108 is further configured to correlate the determined identity 122 of the second entities 118 with the devices 124 and applications 126 accessed or being accessed by the second entity 118. The resulting correlations are stored in databases for audit purposes and/or are included in reports or the like. Moreover, in those embodiments in which the identity 122 of the second entity 118 is determined to an unauthorized entity, the correlated data may be used for investigative analysis or the like.

Figure 2:
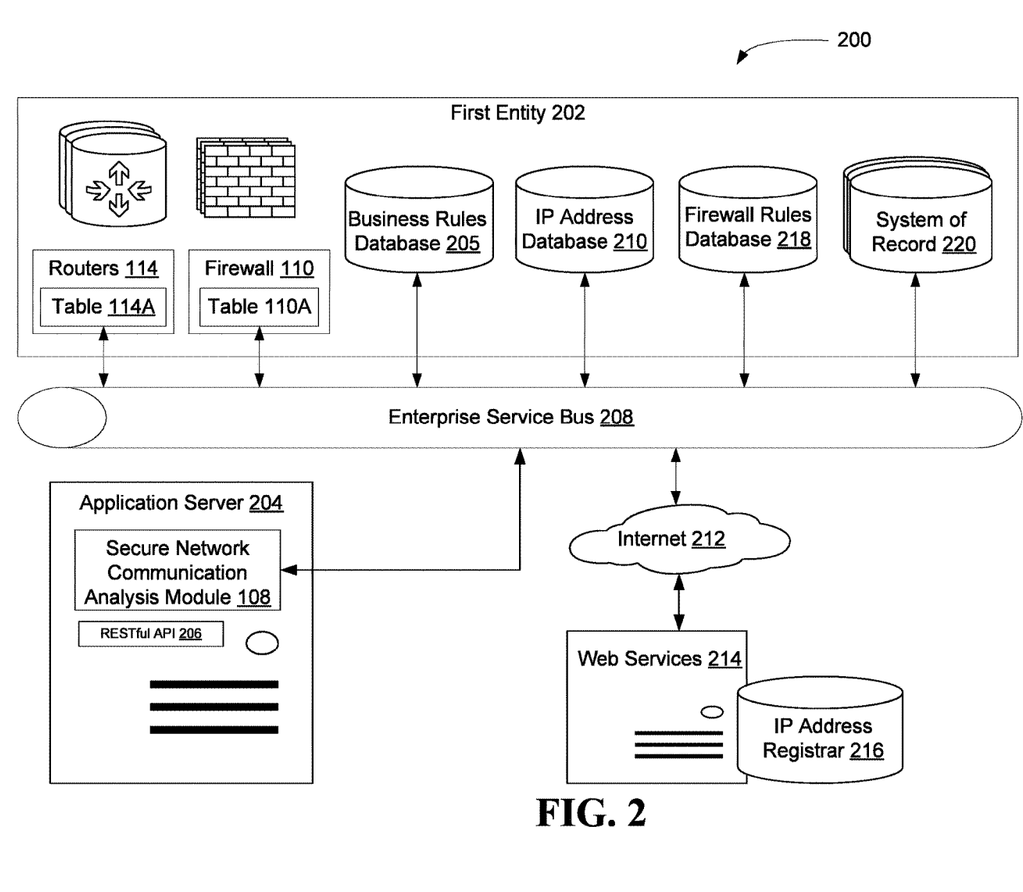
FIG. 2 provides a schematic diagram of a system for analyzing secure network communications to determine endpoints, in accordance with embodiments of the present invention.

Referring to FIG. 2 shown is a schematic diagram 200 illustrating the architecture of a system for analyzing secured network traffic to determine what third-party entities accessed the network and the endpoints accessed or are being accessed by that third-party entity, in accordance with specific embodiments of the present invention. The system includes an application server 204 associated with first entity 202 (i.e., the entity that is attempting to determine which second entities accessed their secure network and devices and/or applications accessed by those second entities). The application server 204 stores, or otherwise has access to, secure network communication analysis module 108. Further, application server 204 may implement RESTful API 206 to make calls or otherwise access various databases and the like used by secure network communication analysis module 108 in determining second entities that have or are currently accessing the secure computing network, the identity of the second entities and the devices and applications accessed or being accessed by the second entities. It should be noted that while FIG. 2 shows an application server 204 as hosting or otherwise have access to the secure network communication analysis module 108 it should be readily apparent that the module 108 can be hosted and/or executed on any computing device within or accessible to the first entity.

The secure network communication analysis module 108 is configured to access the firewalls 110 and routers 114 and, specifically the firewall tables 110A and router tables 114A to obtain all of the IP addresses, both static and dynamic IP addresses that have communicated via the corresponding router or firewall, as well as encryption type and/or Router Access Control List (RACL). The encryption type and RACL may subsequently be used in the methodology to access routers and/or secured/encrypted data. In specific embodiments of the invention, the secure network communication analysis module 108 implements enterprise service bus 208 to make restful API 206 call-outs to the routers 114 and firewalls 110 to obtain the IP addresses. In other embodiments of the invention, the secure network communication analysis module 108 may in other network communication, absent the enterprise service bus 208, as a means of obtaining routers 114 and firewalls 110.

In specific embodiments of the invention, once the IP addresses have been captured from the firewall tables 110A and router tables 114A, secure network communication analysis module 108 compares the IP address in the firewalls 110 to the IP addresses in the routers to determine matches (i.e., same IP address). In response to determining IP address matches and performing any other requisite processing, as dictated by business rules database 205 or the like, such as parsing, de-duping matches or the like, the secure network communication module 108 accesses IP address database 210, which is associated with the first entity 202 (i.e., includes IP addresses belonging to the first entity) to determine which if the matching IP addresses are associated with the first entity 202. In specific embodiments of the invention, the secure network communication analysis module 108 implements enterprise service bus 208 to connect to the IP address database 210 and RESTful API 206 calls are made to the IP address database to determine if matched IP addresses are first entity IP addresses. The enterprise service bus 208 allows for connections to be made in a heterogeneous technology environment to various different services, databases and the like. In response to determining which of the matched IP addresses are first entity IP addresses, the module 108 filters out the first entity IP addresses from the overall plurality of matched IP address; resulting in matched IP addresses that are associated with, or otherwise belong to, second entities (i.e., entities other than the first entity).

In response to determining IP addresses associated with second entities, secure network communication module 108 attempts to determine an identity associated with each of the second entity IP addresses by accessing, via the Internet 212, a web service 214 that includes an IP address registrar 216. The IP address registrar provides for a listing of identities of IP address owners. In specific embodiments of the invention, the secure network communication analysis module 108 implements the enterprise service bus 208 to connect to the web service 214 and the RESTful API makes calls to the web service, whereby the second entity IP addresses are sequentially applied to the IP address registrar 216 to determine, or attempt to determine, the identity of each second entity IP address.

In addition, once the IP addresses associated with the second entities have been determined, secure network communication module 108 determines which devices within the first entity's secure computing network that the second entities have accessed or are currently accessing and which applications executing on such devices that he second entities have accessed/executed or are accessing/executing. In specific embodiments of the invention, the determination of devices and applications is accomplished by having the secure network communication module 108 access firewall rules/management database 218 or a similar database to determine which source IP addresses and which destination IP addresses that the second entity IP address has been granted access to. Once the source IP address and the destination IP addresses have been determined, the secure network communication module 108 determines which of the source and destination IP addresses belong to the first entity by accessing the IP address database 210. In specific embodiments of the invention, the secure network communication analysis module 108 implements enterprise service bus 208 to connect to the database 210 and RESTful API 206 calls are made to the IP address database 210 to determine if the source and destination IP addresses are first entity IP addresses. In response to determining which of the source and destination IP addresses are first entity IP addresses, the module 108 filters out the source and destinations addresses not found in the first entity IP address database 210 (i.e. source and destination IP addresses that are not associated, or otherwise do not belong to, the first entity 202.

Once the source and destination IP addresses associated with the first entity have been determined, the secure network communication analysis module 108 makes queries, based on business rules in business rules database 205 or the like, to various different systems of record (SORs) 220 associated with the first entity 202 to determine if the source or destination address is associated with a device or application (e.g., whether the log-in information stored with an SOR includes the source or destination IP address). In specific embodiments of the invention, the secure network communication analysis module 108 implements enterprise service bus 208 to connect to the SORs 220 and RESTful API 206 calls are made to the IP address database 210 to determine which SORs contain the source or destination IP addresses and the devices and applications associated with the source and destination address entries. In this regard, the RESTful API 206 sequentially applies the source and destination IP addresses to the SORs 220 to determination which devices and/or applications are associated with the source and/or destination IP addresses. It should be noted that in certain embodiments of the invention the SORs are configured to store information pertaining to historical accesses/connections while in other embodiments of the invention the SORs are configured to store information pertain to currently ongoing accesses/connection. As such the present invention is capable of not only determining what devices and applications that a second entity previously accessed/executed but also what devices/applications that a second entity is currently accessing.

In response to determining the devices and applications that the second entity has accessed or is currently accessing, the secure network communication analysis module 108 correlated the identities of the second entities to the devices and/or applications that the corresponding second entity has accessed or is currently accessing. In specific embodiments of the invention the correlated data may be stored for auditing purposes and/or reports generated and disseminated to individuals/groups of interest within the first entity or, in the case in which the second entities are unauthorized second entities, the correlated data may be used for investigation purposes.

Figure 3:
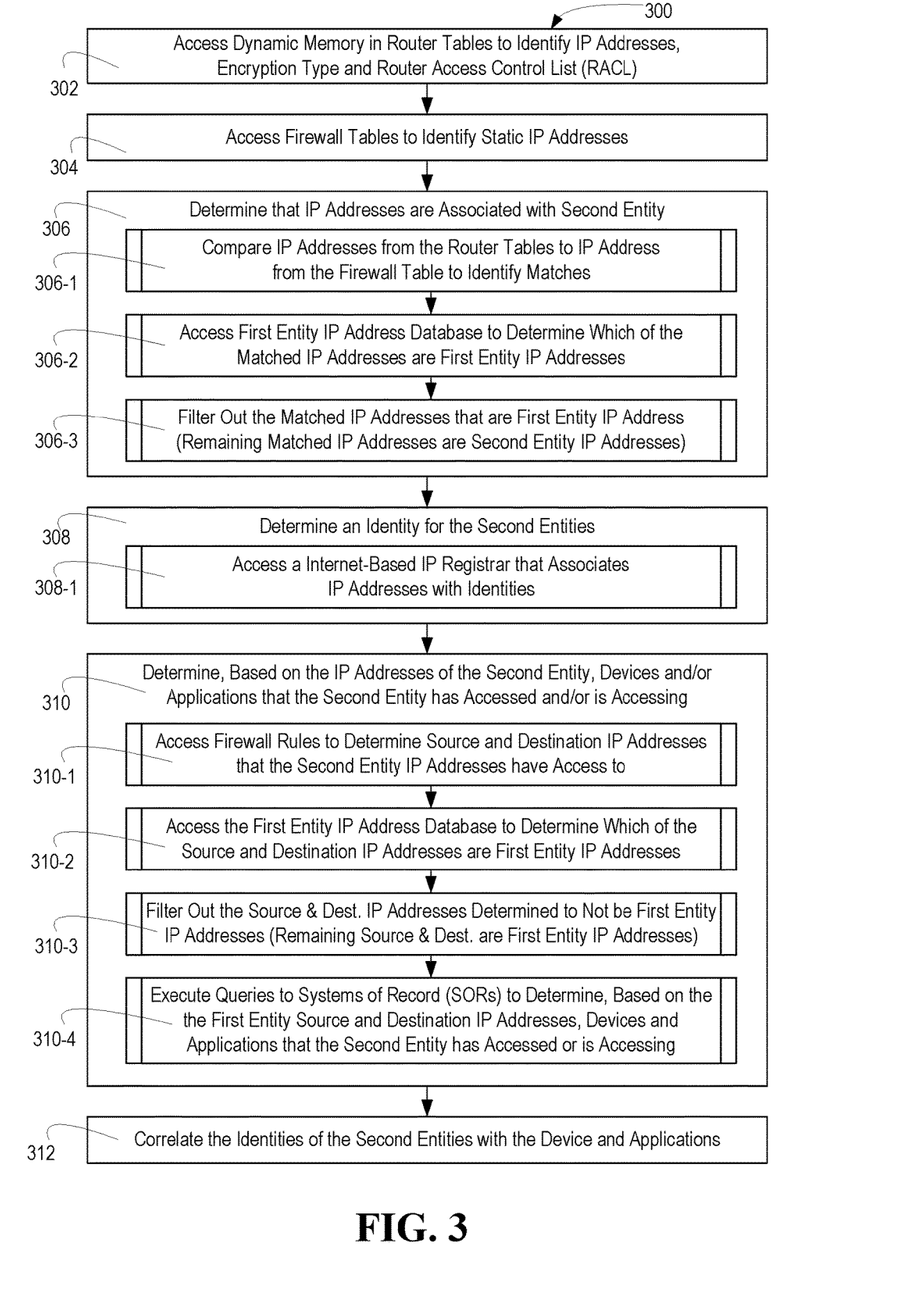
FIG. 3 provides a flow diagram of a method for analyzing secure network communications to determine endpoints, in accordance with embodiments of the present invention.

Referring to FIG. 3 a flow diagram is presented of a methodology 300 for analyzing secure network traffic for determining which third-party entities accessed or are accessing the network and the devices and/or applications within the network that such entities have accessed or are accessing, in accordance with specific embodiments of the present invention. In specific embodiments of the invention, the methodology 300 herein described may be scheduled to run on a predetermined interval or, in other embodiments of the invention, the methodology 300 may be dynamically implemented on an as-needed basis. At Event 302, dynamic memory is accessed to retrieve router table associated with routers disposed with a secure computing network of a first entity. The router tables are accessed for the purpose of identifying dynamic IP addresses, encryption type and or Router Access Control List (RACL). The encryption type and RACL may subsequently be implemented in the methodology to access routers and or secure/encrypted data. At Event 304, firewall tables associated with firewalls disposed within the secure computing network of the first entity are accessed to identify static IP addresses. In specific embodiments of the invention a restful API and an enterprise service bus may be implemented to make call-outs to the routers and firewalls.

At Event 306, IP addresses are determined to be associated with second entities (i.e., entities other the first entities, such as authorized third-party entities, e.g., vendors, B2B partners or the like or unauthorized entities). In accordance with specific embodiments of the invention, the IP addresses associated with the second entities may be determined by, at Sub-Event 306-1, comparing the IP addresses from the router tables to IP addresses in the firewall tables to identify matches (i.e., the same IP address in both a firewall table and a router table). Further, at Sub-Event 306-2, a first entity IP address database is accessed to determine which of the matched IP addresses are first entity IP addresses and, at Sub-Event 306-3, the matched IP addresses that are determined to be first entity IP addresses are filtered out; resulting in the remaining matched IP addresses deemed to second entity IP addresses.

At Event 308, the identity (i.e., the owner) of the second entity IP addresses is determined. According to specific embodiments of the invention, the identity of the second entity IP addresses are determined by, at Sub-Event 308-1 accessing an Internet-based IP registrar that associates/links IP addresses with owners of the address (i.e., the identity of the second entities).

At Event 310, which may be conducted in parallel with Event 308, the devices and/or applications within the secure computing network of the first entity that were previously accessed and/or are currently being accessed are determined based on the IP addresses of the second entity. In accordance with specific embodiments of the invention, the devices and applications are determined by, at Sub-Event 310-1, accessing firewall management rules to determine which source IP addresses and which destination IP addresses that the second entity IP address has access to. Once the source IP address and the destination IP addresses have been determined, at Sub-Event 310-2, the first entity IP address database is accessed to determine which of the source and destination IP addresses belong to the first entity. In response to determining which of the source and destination IP addresses are first entity IP addresses, at Sub-Event 310-3 the source and destinations addresses not found in the first entity IP address database are filtered out; resulting in the source and destination IP addresses belonging to the first entity.

Once the source and destination IP addresses belonging to the first entity have been determined, at Sub-Event 310-4, queries are executed to various systems of record (SORs) to determine the devices and applications that the second entity has accessed or is currently accessing. The queries may be based on one or more business rules or the like. The queries include one of the source or destination IP addresses determined to belong to the first entity. The SORs may contain "live" data of current network sessions and, therefore, can be accessed to determine which devices and/or applications a second entity is currently accessing/executing.

At Event 312, the identities of the second entities are correlated with the devices and applications determined to have been accessed by a corresponding second entity or currently being accessed by a second entity. The correlated information is subsequently stored for audit purposes or the like and/or reports are generated and disseminated to parties with the first entity.

Thus, systems, apparatus, methods, and computer program products described above provide for analyzing secured network traffic to determine which third-party entities (both authorized and unauthorized) have accessed the network the devices and/or applications have been accessed or are being accessed by the third-party entities. In this regard embodiments of the present invention fully automate the verification and validation of secured network accesses performed by an authorized third-party entity and the monitoring and investigation of unauthorized third-party threats/attacks on the secured network.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for validation, monitoring and investigation of secured network accesses performed by external entities on a secured network, wherein the apparatus is configured for analyzing secure network electronic communications for determining endpoints and for determining devices or applications currently being accessed, the apparatus comprising:

a computing platform having a memory and at least one processor in communication with the memory; and a secure network communication analysis module stored in the memory, executable by the processor and configured to:

receive Internet Protocol (IP) addresses from a plurality of routers and a plurality of firewalls, wherein the routers and firewalls are disposed within a secure computing network of a first entity, determine that one or more of the IP addresses are associated with second entities other than the first entity by (i) comparing the IP addresses received from the routers to the IP addresses received from the firewalls to identify one or more matches between an IP address received from the routers and an IP address received from the firewalls, (ii) accessing a first entity IP address database to determine which of the one or more matched IP addresses are associated with the first entity, and (iii) filtering out the one or more matched IP addresses that are determined to be associated with the first entity, wherein the one or more matched IP addresses remaining after the filtering are defined as IP addresses associated with the second entities, determine an identity for one or more of the second entities, determine one or more devices disposed within the secure computing network and one or more applications executable within the secure computing network that the second entities are currently accessing, based on the one or more IP addresses associated with the second entities, by: (i) determining one or more source IP addresses and one or more destination IP addresses that the IP addresses associated with the second entities has access to within the first entity, (ii) accessing a first entity IP address database to determine which of the source IP addresses and destination IP addresses are associated with the first entity, and (iii) filtering out the source IP addresses and the destination IP addresses that are determined to not be associated with the first entity, wherein the source IP addresses and destination IP addresses remaining after the filtering are defined as source IP addresses associated with the first entity and destination IP associated with the first entity, (iv) executing queries to one or more of the Systems of Record (SOR) to determine at least one of one or more devices and one or more applications that are currently being accessed by the second entity using one of the source IP addresses associated with the first entity or destination IP addresses associated with the first entity, correlate the identity of the one or more second entities with at least one of the devices determined to being currently accessed by a corresponding second entity or the applications determined to being currently accessed by a corresponding second entity;

generate live correlated data associated with the identity of the one or more second entities and at least one of the devices determined to being currently accessed or the applications determined to being currently accessed by the corresponding second entity;

disseminate the generated live correlated data to at least one of the devices determined to being currently accessed or the applications determined to being currently accessed; and initiate, in real-time, an investigation of a current ongoing threat associated with the corresponding second entity that is currently accessing at least one of the devices or the applications.

2. The apparatus of claim 1, wherein the secure network communication analysis module is further configured to receive the IP addresses by accessing router tables and firewall tables stored in memory of the plurality of routers and firewalls to identify static IP addresses and dynamic IP addresses stored in the tables.

3. The apparatus of claim 1, wherein the secure network communication analysis module is further configured to determine the identity of each second entity by accessing an Internet-based IP registrar that associates IP addresses with identities of entities.

4. The apparatus of claim 3, wherein the secure network communication analysis module is further configured to implement an enterprise service bus to make RESTful (Representational State Transfer) Application Programming Interface (API) calls to a web service hosting the Internet-based IP registrar to apply, sequentially, the one or more IP addresses associated with the second entities to the IP registrar to identify identities of the second entities.

5. The apparatus of claim 1, wherein the secure network communication analysis module is further configured to determine the one or more source IP addresses and the one or more destination IP addresses that the IP addresses associated with the second entities has access to within the first entity by implementing an enterprise service bus to make RESTful (Representational State Transfer) Application Programming Interface (API) calls to a firewall rules database to apply, sequentially, the IP addresses associated with the second entities to firewall rules to determine the one or more source IP addresses and the one or more destination IP addresses that the IP address associated with the second entity has access to.

6. The apparatus of claim 1, wherein the secure network communication analysis id further configured to execute the queries by implementing an enterprise service bus to make RESTful (Representational State Transfer) Application Programming Interface (API) calls to the SORs to determine one or more devices that were accessed using one of the source IP addresses associated with the first entity or destination IP addresses associated with the first entity.

7. The apparatus of claim 1, wherein the secure network communication analysis module is further configured to determine the applications that the second entities are accessing by executing queries to one or more systems of records within the first entity to determine one or more devices that were accessed using one of the source IP addresses associated with the first entity or destination IP addresses associated with the first entity and determining one or more applications executed by the one or more devices during a log-in session associated with source IP address or the destination IP address.

8. The apparatus of claim 1, wherein the secure network communication analysis module is further configured to generate and initiate communication of one or more reports that indicate the identity of the one or more second entities correlated to at least one of the devices determined to have been accessed by the corresponding second entity or the applications determined to have been accessed by the corresponding second entity.

9. A system for validation, monitoring and investigation of secured network accesses performed by external entities on a secured network, wherein the system is configured for analyzing secure network electronic communications for determining endpoints and for determining devices or applications currently being accessed, the system comprising:

a plurality of routers disposed within a secure computing network of a first entity;

a plurality of firewalls disposed within the secure computing network of the first entity;

an Internet Protocol (IP) address database that stores IP addresses associated with the first entity;

a firewall rules database that stores first entity rules related to source IP addresses and destination IP addresses accessibility by specified IP addresses;

a plurality of Systems of Record (SOR) associated with the first entity that include log-in records that indicate IP addresses used to log-in to a specified computing device;

a computing platform having a memory and at least one processor in communication with the memory; and a secure network communication analysis module stored in the memory, executable by the processor and configured to:

receive Internet Protocol (IP) addresses from the plurality of routers and the plurality of firewalls, determine that one or more of the IP addresses are associated with second entities other than the first entity by (i) comparing the IP addresses received from the routers to the IP addresses received from the firewalls to identify one or more matches between an IP address received from the routers and an IP address received from the firewalls, (ii) accessing a first entity IP address database to determine which of the one or more matched IP addresses are associated with the first entity, and (iii) filtering out the one or more matched IP addresses that are determined to be associated with the first entity, wherein the one or more matched IP addresses remaining after the filtering are defined as IP addresses associated with the second entities,
determine an identity for one or more of the second entities,
determine one or more devices disposed within the secure computing network and one or more applications executable within the secure computing network that the second entities are currently accessing, based on the one or more IP addresses associated with the second entities, by:
(i) accessing the firewall rules database to determine one or more source IP addresses and one or more destination IP addresses that the IP addresses associated with the second entities has access to within the first entity,
(ii) accessing the IP address database to determine which of the source IP addresses and destination IP addresses are associated with the first entity,
(iii) filtering out the source IP addresses and the destination IP addresses that are determined to not be associated with the first entity, wherein the source IP addresses and destination IP addresses remaining after the filtering are defined as source IP addresses associated with the first entity and destination IP associated with the first entity, and
(iv) executing queries to one or more of the SORs to determine one or more devices that are currently being accessed using one of the source IP addresses associated with the first entity or destination IP addresses associated with the first entity,
correlate the identity of the one or more second entities with at least one of the devices determined to being currently accessed by a corresponding second entity or the applications determined to being currently accessed by a corresponding second entity;
generate live correlated data associated with the identity of the one or more second entities and at least one of the devices determined to being currently accessed or the applications determined to being currently accessed by the corresponding second entity;
disseminate the generated live correlated data to at least one of the devices determined to being currently accessed or the applications determined to being currently accessed; and
initiate, in real-time, an investigation of a current ongoing threat associated with the corresponding second entity that is currently accessing at least one of the devices or the applications.

10. The system of claim 9, wherein the secure network communication analysis module is further configured to receive the IP addresses by accessing router tables and firewall tables stored in memory of the plurality of routers and firewalls to identify static IP addresses and dynamic IP addresses stored in the tables.

11. The system of claim 9, wherein the secure network communication analysis module is further configured to determine the identity for one or more of the second entities by accessing an Internet-based IP registrar that associates IP addresses with identities of entities.

12. The system of claim 11, wherein the secure network communication analysis module is further configured to implement an enterprise service bus to make RESTful (Representational State Transfer) Application Programming Interface (API) calls to a web service hosting the Internet-based IP registrar to apply, sequentially, the one or more IP addresses associated with the second entities to the IP registrar to identify identities of the second entities.

13. The system of claim 9, wherein the secure network communication analysis module is further configured to determine the one or more source IP addresses and the one or more destination IP addresses that the IP addresses associated with the second entities has access to within the first entity by implementing an enterprise service bus to make RESTful (Representational State Transfer) Application Programming Interface (API) calls to the firewall rules database to apply, sequentially, the IP addresses associated with the second entities to firewall rules to determine the one or more source IP addresses and the one or more destination IP addresses that the IP address associated with the second entity has access to.

14. The system of claim 9, wherein the secure network communication analysis module is further configured to execute the queries by implementing an enterprise service bus to make RESTful (Representational State Transfer) Application Programming Interface (API) calls to the SORs to determine one or more devices that were accessed using one of the source IP addresses associated with the first entity or destination IP addresses associated with the first entity.

15. The system of claim 9, wherein the secure network communication analysis module is further configured to generate and initiate communication of one or more reports that indicate the identity of the one or more second entities correlated to at least one of the devices determined to have been accessed by the corresponding second entity or the applications determined to have been accessed by the corresponding second entity.

16. A computer program product for validation, monitoring and investigation of secured network accesses performed by external entities on a secured network, wherein the computer program product is configured for analyzing secure network electronic communications for determining endpoints and for determining devices or applications currently being accessed, the computer program product comprising:
a non-transitory computer-readable medium comprising:
a first set of codes for causing a computer to receive Internet Protocol (IP) addresses from a plurality of routers and a plurality of firewalls, wherein the routers and firewalls are disposed within a secure computing network of a first entity;
a second set of codes for causing a computer to determine that one or more of the IP addresses are associated with second entities other than the first entity by (i) comparing the IP addresses received from the routers to the IP addresses received from the firewalls to identify one or more matches between an IP address received from the routers and an IP address received from the firewalls, (ii) accessing a first entity IP address database to determine which of the one or more matched IP addresses are associated with the first entity, and (iii) filtering out the one or more matched IP addresses that are determined to be associated with the first entity, wherein the one or more matched IP addresses remaining after the filtering are defined as IP addresses associated with the second entities;
a third set of codes for causing a computer to determine an identity for one or more of the second entities;
a fourth set of codes for causing a computer to, determine one or more devices disposed within the secure computing network and one or more applications executable within the secure computing network that the second entities are currently accessing, based on the one or more IP addresses associated with the second entities, by: (i) determining one or more source IP addresses and one or more destination IP addresses that the IP addresses associated with the second entities has access to within the first entity, (ii) accessing a first entity IP address database to determine which of the source IP addresses and destination IP addresses are associated with the first entity, and (iii) filtering out the source IP addresses and the destination IP addresses that are determined to not be associated with the first entity, wherein the source IP addresses and destination IP addresses remaining after the filtering are defined as source IP addresses associated with the first entity and destination IP associated with the first entity, (iv) executing queries to one or more of the Systems of Record (SOR) to determine at least one of one or more devices and one or more applications that are currently being accessed by the second entity using one of the source IP addresses associated with the first entity or destination IP addresses associated with the first entity, a fifth set of codes for causing a computer to correlate the identity of the one or more second entities with at least one of the devices determined to being currently accessed by a corresponding second entity or the applications determined to being currently accessed by a corresponding second entity;

a sixth set of codes for generating live correlated data associated with the identity of the one or more second entities and at least one of the devices determined to being currently accessed or the applications determined to being currently accessed by the corresponding second entity;

a seventh set of codes for disseminating the generated live correlated data to at least one of the devices determined to being currently accessed or the applications determined to being currently accessed; and an eight set of codes for initiating, in real-time, an investigation of a current ongoing threat associated with the corresponding second entity that is currently accessing at least one of the devices or the applications.

\* \* \* \* \*